(12) United States Patent        (10) Patent No.:     US 7,414,705 B2
     Boillot                      (45) Date of Patent:    Aug. 19, 2008

(54) METHOD AND SYSTEM FOR RANGE MEASUREMENT

(75) Inventor: Marc Andre Boillot, Plantation, FL (US)

(73) Assignee: NaviSense, Plantation, FL (US)

( * ) Notice: Subject to any disclaimer, the term of this patent is extended or adjusted under 35 U.S.C. 154(b) by 36 days.

(21) Appl. No.: 11/562,410

(22) Filed: Nov. 21, 2006

(65) Prior Publication Data

US 2007/0121097 A1    May 31, 2007

Related U.S. Application Data

(60) Provisional application No. 60/740,358, filed on Nov. 29, 2005.

(51) Int. Cl.
    *G01C 3/08*  (2006.01)
(52) U.S. Cl. .................. 356/5.01; 356/5.09; 356/5.1; 356/28; 345/156
(58) Field of Classification Search ............ 356/28, 356/5.01, 5.1, 5.09
    See application file for complete search history.

(56) References Cited

U.S. PATENT DOCUMENTS

| | | | | |
|---|---|---|---|---|
| 2,451,822 | A * | 10/1948 | Guanella | 342/112 |
| 3,119,067 | A * | 1/1964 | Wohlenberg et al. | 455/314 |
| 5,274,363 | A | 12/1993 | Koved | |
| 5,550,671 | A * | 8/1996 | Simpson et al. | 359/337 |
| 6,130,663 | A | 10/2000 | Null | |
| 6,137,427 | A | 10/2000 | Binstead | |
| 6,313,825 | B1 * | 11/2001 | Gilbert | 345/156 |
| 6,614,853 | B1 * | 9/2003 | Koslar et al. | 375/271 |
| 6,937,227 | B2 | 8/2005 | Qamhiyah | |
| 7,078,911 | B2 | 7/2006 | Cehelnik | |
| 7,081,884 | B2 | 7/2006 | Kong | |
| 7,092,109 | B2 | 8/2006 | Satoh | |
| 7,130,754 | B2 | 10/2006 | Satoh | |
| 2003/0025626 | A1 * | 2/2003 | McEwan | 342/21 |
| 2003/0059082 | A1 * | 3/2003 | Suzuki et al. | 382/100 |
| 2004/0130702 | A1 * | 7/2004 | Jupp et al. | 356/5.01 |

(Continued)

OTHER PUBLICATIONS

Steven W. Smith, The Scientist and Engineer's Guide to Digital Signal Processing, California Technical Pub.; 1st ed edition (1997) ISBN 0-9660176-3-3, http://www.dspguide.com/.*

(Continued)

*Primary Examiner*—Thomas H. Tarcza
*Assistant Examiner*—Timothy A Brainard
(74) *Attorney, Agent, or Firm*—Marc Boillot

(57) ABSTRACT

A method (200) and system (220) for range detection is provided. The system can include a sensing unit (110) for detecting a location and movement of a first object (401), and a processor (107) for providing a measure of the movement. The processor can convert the measure to a coordinate signal for moving a second object (124) in accordance with a location and movement of the first object. The system can include a pulse shaper (109) for producing a pulse shaped signal (167) and a phase detector (101) for identifying a movement from a reflected signal (166). A portion of the pulse shaped signal can be a frequency modulated region (312), a constant frequency region (316), or a chirp region (324). In one arrangement, the pulse shaper can be a cascade of all-pass filters (515) for providing phase dispersion.

7 Claims, 7 Drawing Sheets

U.S. PATENT DOCUMENTS

| | | | |
|---|---|---|---|
| 2004/0135992 A1* | 7/2004 | Munro | 356/4.01 |
| 2004/0184037 A1* | 9/2004 | Muenter et al. | 356/486 |
| 2004/0189512 A1* | 9/2004 | Takashima et al. | 342/70 |
| 2005/0168719 A1* | 8/2005 | Stierle et al. | 356/4.01 |
| 2005/0240101 A1* | 10/2005 | Kato et al. | 600/437 |
| 2005/0273533 A1* | 12/2005 | Hughes | 710/62 |
| 2006/0161871 A1 | 7/2006 | Hotelling | |
| 2006/0256090 A1 | 11/2006 | Huppi | |

OTHER PUBLICATIONS

Steven W. Smith, The Scientist and Engineer's Guide to Digital Signal Processing, California Technical Pub.; 1st ed edition (1997) ISBN 0-9660176-3-3, http://www.dspguide.com/.*

* cited by examiner

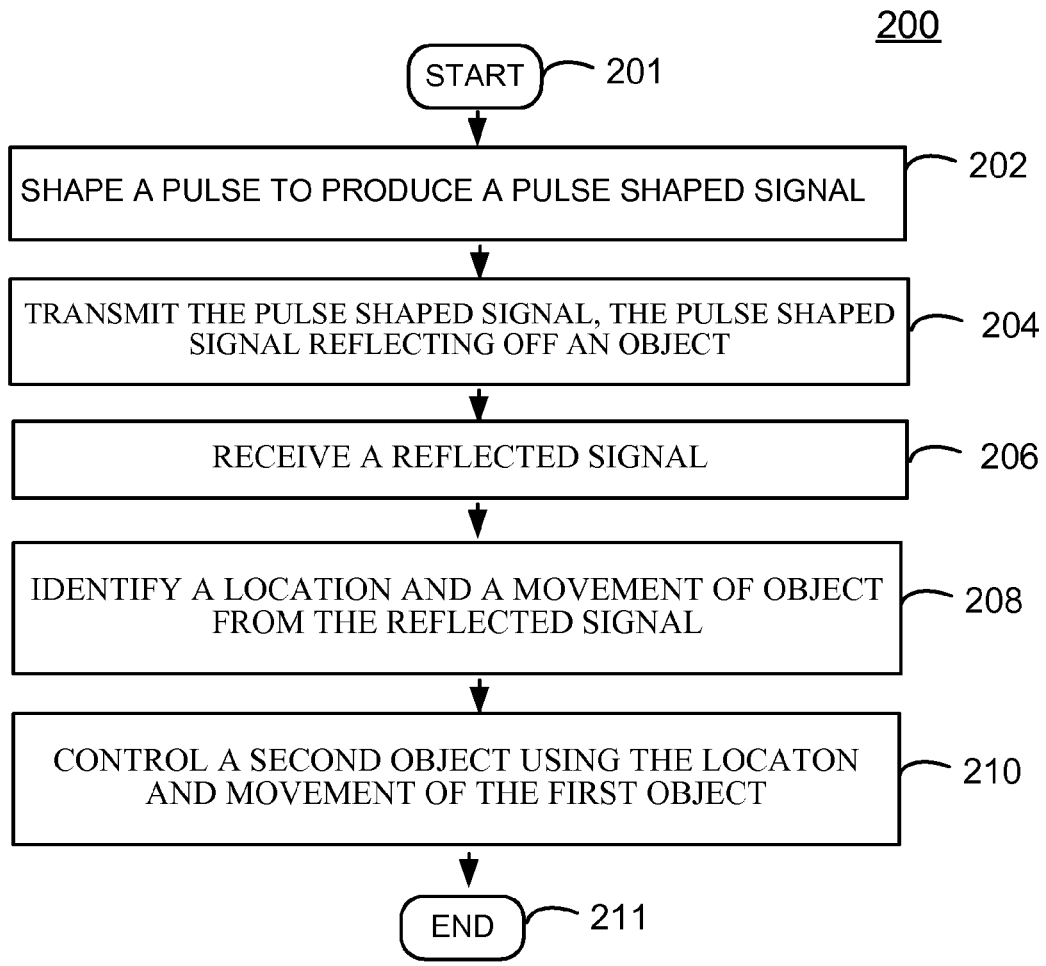

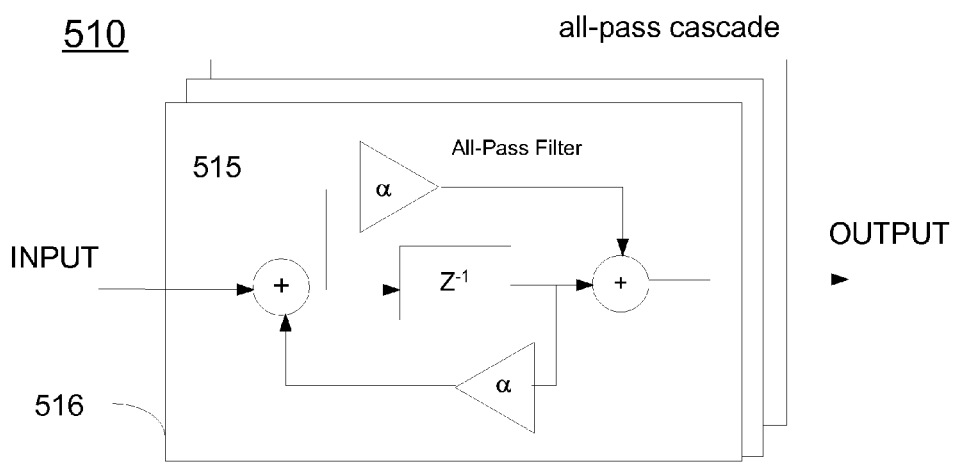
FIG 11
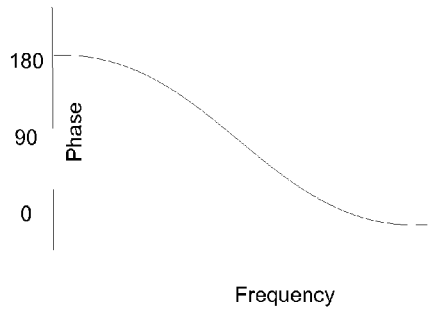
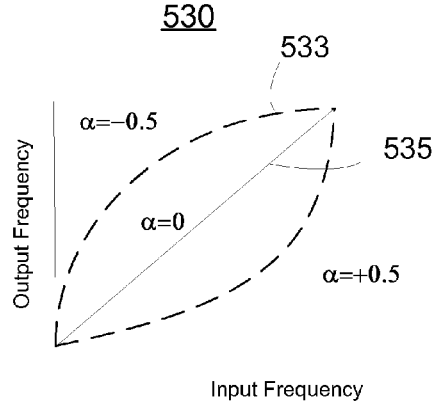
FIG 12

METHOD AND SYSTEM FOR RANGE MEASUREMENT

CROSS-REFERENCE TO RELATED APPLICATIONS

This application claims the priority benefit of U.S. Provisional Patent Application No. 60/740,358 entitled "Method and System for Range Measurement" filed Nov. 29, 2005, the entire contents of which are hereby incorporated by reference. This application also incorporates by reference the following Utility Applications: U.S. patent application Ser. No. 11/559,295, entitled "Method and System for Directing a Control Action", filed on Nov. 13, 2006, U.S. patent application Ser. No. 11/559,325, entitled "Method and System for Touchless User Interface Control", filed on Nov. 13, 2006; and U.S. patent application Ser. No. 11/562,404, entitled "Method and System for Object Control", filed on Nov. 21, 2006.

BACKGROUND

1. Field

The present invention generally relates to the field of touchless user interfaces, and more particularly, to input pointing devices.

2. Introduction

Motion sensing systems can detect movement of an object. As one example, a radar unit can transmit and receive high energy signals for detecting a large metallic object. High energy signals can reflect of the metallic object due to the properties of the metal. As another example, a weather radar can be used to track storm movement. The radar can determine the storm distance by measuring a time difference between when a radar signal was emitted and when a reflection of the radar signal was received. Estimating a time of flight generally involves detecting a time of arrival of the reflected signal which can be based on detection of a pulse. The quality of the reflected signal can be distorted due to transmission effects or environmental effects.

Radar is commonly used for long range distance measurements, such as tracking a vehicle or tracking a storm. Radar units are generally large devices deployed in broad areas where long distances are common. The time length of a radar pulse is generally small relative to a time distance of the detected object. Pulse compression can enhance the performance of radar range detection. Pulse compression, also known as pulse coding, is a signal processing technique to maximize the sensitivity and resolution of radar systems. Transmitting longer pulses can improve the radar's sensitivity by increasing the average transmitted power. However, lengthening the radar pulse has the effect of degrading the range resolution of the radar because the radio pulse is spread over a larger distance.

Moreover, radar units, or radio frequency signals, are not generally suitable for small and precise range measurements on non-metallic objects. The time length of the pulse can lead to range measurement errors over very short distances. Slight perturbations of a pulse signal can lead to inaccuracies in the time of flight measurement. The pulse can be smeared in time as a result of transmission and reflections which distorts the time arrival for detection. Moreover, sensing devices responsible for emitting and transmitting the pulse signal can be imbalanced. The imbalances produce variations in the pulse that can result to false detections. This can also lead to inaccurate time estimates. Amplitude variations can also lead to detection errors which lead to inaccurate arrival times.

SUMMARY

Broadly stated, embodiments of the invention are directed to a method and system for monitoring motion. One embodiment is directed to a system for short range detection. The system can include a pulse shaper for producing a pulse shaped signal, and at least one transmit sensor operatively coupled to the pulse shaper for transmitting the pulse shaped signal. The pulse shaped signal can reflect off a first object to produce a reflected signal. The pulse can be an ultrasonic signal or a light signal. The system can include at least one receive sensor for receiving the reflected signal, and a processor operatively coupled to the second sensor for identifying a location and a movement of the first object from the reflected signal. The system can include a phase detector operatively coupled to the processor for identifying a phase of the reflected signal, wherein the processor uses the phase to identify the movement. In one arrangement, the pulse shaper can include an all-pass filter for dispersing a phase of the pulse shaped signal. The pulsed shaped signal can include an amplitude modulated region, frequency modulated region, constant frequency region, phase modulated region, or a chirp region.

One embodiment is directed to a method for range detection. The method can include shaping a pulse signal to produce a pulse shaped signal, and transmitting the pulse shaped signal. The pulse shaped signal can reflect off a first object to produce a reflected signal. The method can include receiving the reflected signal, and identifying a location and a movement of the first object from the reflected signal. The shaping can use a combination of amplitude modulation, frequency modulation, and phase modulation. In one aspect, the step of receiving can include converting the reflected signal to a sinc signal, identifying a maximum point of the sinc signal, and estimating an arrival time from the maximum point. The method can further include estimating a velocity of the first object from a constant frequency region in the pulse shaped signal, and estimating a location of the first object from a frequency modulated region in the pulse shaped signal.

In one arrangement a processor can use the range measurement for controlling a second object in accordance with a location and a movement of a first object. The location and movement of the first object can be converted to a coordinate for controlling the second object. As an example, the first object can be a finger, and the second object can be a user interface control. The method can further include identifying an arrival time from a correlation between a first reflected signal and a second reflected signal, identifying a phase delay from the correlation for establishing a relative displacement of the first object, and controlling a second object in accordance with the coordinate and the relative displacement.

Another embodiment is directed to a sensing device for providing touchless control of an object. The sensing device can include a pulse shaper for producing a pulse shaped signal, the pulse shaped signal reflecting off a first object to produce a reflected signal, and a processor operatively coupled to the pulse shaper for receiving the reflected signal, identifying a location and a movement of the first object from the reflected signal, and controlling a second object in accordance with the location and the movement of the first object. In a hardware arrangement, the pulse shaper can be a physical transducer element that emits the pulse shaped signal with a frequency modulation portion and an amplitude modulation portion.

In a software arrangement, the pulse shaper can include at least one all-pass filter as a phase warping element for providing phase dispersion in the pulse shaped signal. This allows the pulse shaper to concentrate an energy of the pulse signal within a narrow region of the pulsed shaped signal to produce a peak in the pulse shaped signal. The peak can identify a time of flight. The pulse shaper can transmit the pulsed shaped signal as a continuous transmission of a frequency modulated signal, a phase modulated signal, or an amplitude modulated signal. The sensing device can include a phase detector operatively coupled to the processor for identifying a phase of the reflected signal. The processor can estimate a location of the first object using a frequency modulated region of the reflected signal, and a velocity of the first object from the phase in a continuous frequency region of the reflected signal.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

FIG. 1 is a touchless sensing unit for range detection in accordance with an embodiment of the inventive arrangements;

FIG. 2 is method for touchless control using range detection and pulse shaping in accordance with an embodiment of the inventive arrangements;

FIG. 11 is a phase warping element used for pulse shaping in accordance with an embodiment of the inventive arrangements; and FIG. 12 is a phase change plot 520 and a frequency warping plot used in pulse shaping in accordance with an embodiment of the inventive arrangements.

DETAILED DESCRIPTION

Figure 3:
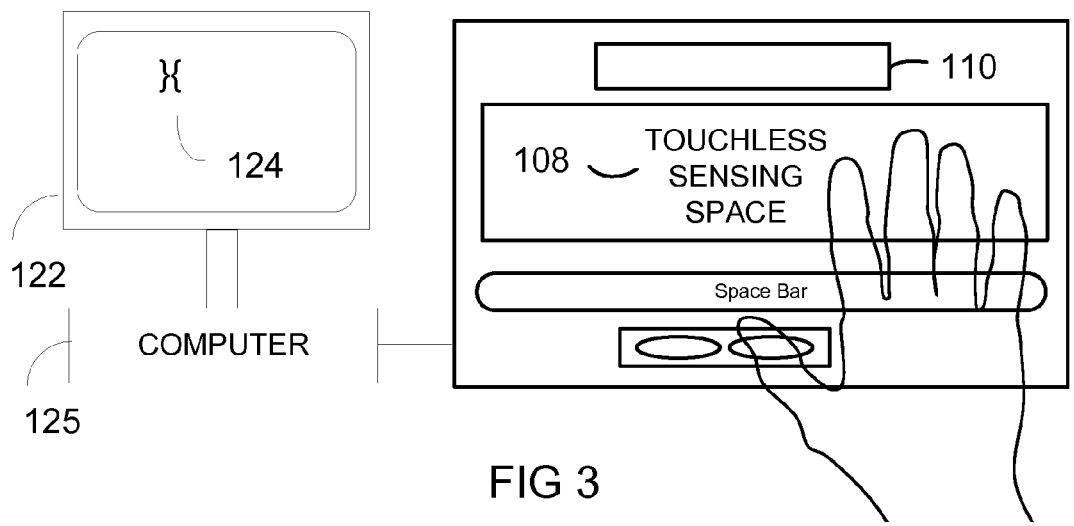
FIG. 3 is an exemplary configuration of the touchless sensing unit in a keyboard for providing touchless user interface control in accordance with an embodiment of the inventive arrangements.

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a midlet, a source code, an object code, a shared library/dynamic load library and/or other sequence of instructions designed for execution on a computer system. The term touchless sensing is defined as sensing movement without physically touching the object causing the movement. The term "pulse" can be defined as a fluctuation in a signal, such as an sudden or gradual increase in a voltage followed by a sudden or gradual decrease in voltage. The term "square pulse" can be defined as a signal having two levels, such as −1 and +1, or 0 and 1, the signal may or may not be modulated. The term "phase" can be defined as a complex angular rotation, or a projection of a complex angular rotation. The term "Time of Flight" can be defined as the time between sending and receiving a signal, such as a pulse. The term "differential Time of Flight" can be defined as a change in the time of flight. The term "phase warping" can be defined as changing a phase in accordance with a non-linear function. The term "range" can be defined as a distance or a location of an object. The term "range detection" can be defined as identifying a distance, location, or movement of an object. The term "chirp" can be defined as a signal that is phase modulated, amplitude modulated, frequency modulated, or a combination therof.

One embodiment of the invention is directed to a motion sensing device for controlling a second object in accordance with a motion of a first object object. In such regard, the first object is the control object and the second object is the controlled object. In one arrangement, the motion sensing device can capture a coordinate of the first object using time of flight measurements. As one example, the motion sensing device can transmit and receive ultrasonic signals, acoustic signals, or light signals for determining the time of flight measurement. In one application, the motion sensing device can be used in combination with a computer or mobile device for detecting finger motion for controlling a cursor or object on a display.

FIG. 1

FIG. 1 shows a sensing unit 110 for motion detection. The sensing unit 110 can include a pulse shaper 101 for producing a pulse shaped signal, at least one transmit element 102 for transmitting the pulse shaped signal, the pulse shaped signal reflecting off a first object to produce a reflected signal, at least one receive sensor 102 for receiving the reflected signal, and a processor 107 operatively coupled to the receive sensor for identifying a location and a movement of the first object from the reflected signal. The transmitter and emitter can be the same element to provide both transmit and receive operations. The sensing elements 102 can be operatively coupled to the pulse shaper 101 and the phase detector 109. The phase detector 109 can identify a phase of the reflected signal, and the processor 107 can use the phase to identify the movement. The processor 107 can include additional processing logic such as thresholds, comparators, logic gates, clocks, and the like for detecting an object's motion.

The sensing element 102, can be an array of sensing elements. As one example, the sensing element can be an ultrasonic transmitter and ultrasonic receiver 102 for transmitting and receiving ultrasonic signals. In another arrangement, the sensing element 102 can be an array of micro-acoustic microphones and micro speakers for transmitting and receiving audio signals. The transmitter and emitter can be the same transducer for providing dual functions. In another arrangement, the sensing element can be CCD camera elements or MEMS camera elements for receiving light. In the case of using ultrasonic sensing elements, the sensing unit 110 can employ pulse-echo detection for estimating a range of an object within view of the sensing elements. The sensing unit 110 can be an Application Specific Integrated Circuit (ASIC) or Field Programmable Gate Array (FPGA).

FIG. 2

Referring to FIG. 2, a method 200 for range detection is shown. When describing the method 200, reference will be made to FIG. 1, although it must be noted that the method 200 can be practiced in any other suitable system or device. Moreover, the steps of the method 200 are not limited to the particular order in which they are presented in FIG. 2. The method 200 can also have a greater number of steps or a fewer number of steps than those shown in FIG. 2.

At step 201, the method 200 can start. At step 202, a pulse can be shaped to produce a pulse shaped signal. In practice, the pulse can be a square wave signal that can be input to a transmit element. The pulse can cause the transmitter element to vibrate for the duration of the pulse. For example, referring to FIG. 1, the processor can generate a pulse with a 10 volt rising and falling edge. If the processor sends the pulse to a transmit element 102, the transmit element will emit a pulse at a fundamental frequency of the transducer. For example, the transmit element 102 may have a fundamental frequency of 40 Khz. In response to the pulse, the transmit element will turn on and off for a duration equal to the time length of the pulse. The transmitter may however ring which smears the pulse. Accordingly, the processor 107 can send the pulse to the pulse shaper 101 for shaping prior to transmission. The pulse shaper can focus the energy of the pulse into a narrow peak by introducing phase dispersion and frequency modulation. This suppresses some of the smearing since the energy is spread out over a larger frequency band.

At step 204, the pulse shaped signal can be transmitted. The pulse shaped signal can reflect off an object and produce a reflection signal. For example, referring to FIG. 1, a transmit element 102 can emit the pulse shaped signal, which can reflect off an object in a field of view of the transmitter. The field of view is dependent on the signal strength of the pulse, and the location of the object in the view. At step 206, the reflected signal can be received. For example, referring to FIG. 1, a receive element 102, which also may be a transmit element, can capture the reflected signal. The processor 107, which is operatively coupled to the receive element 102, can identify a movement and location of the object from the reflected signal, which corresponds to step 208. In particular, the reflected signal is a delayed and slightly distorted version of the pulse shaped signal. Accordingly, the reflected signal has highly concentrated energy in time yet spread out in frequency. The processor 107 can apply an inverse pulse shape filter to restore the original pulse. The processor 107 can then identify a rising edge of the pulse to determine an arrival time of the reflected signal. Briefly, the inverse pulse shape performs the opposite as the pulse shaper. That is, the inverse pulse shaper spreads out the concentrated energy over a narrow frequency range.

At step 210, a second object can be controlled using the location and the movement of the first object. For example, the sensing unit 110 detects a location and movement of an object within a field of view, and uses the location and movement to control another object that is not within the field of view. As one example, the first object can be a control object, and the second object can be a controlled object. The second object can be controlled in accordance with a location and movement of the first object. At step 211, the method 200 can end.

FIG. 3

Referring to FIG. 3, one exemplary application for the sensing unit 110 and method 200 is shown. Briefly, the sensing unit 110 can be integrated with a keyboard 220 for providing touchless user interface control. A user can raise a finger in the touchless sensing space 108 and control a cursor object 124 in a display 122. In such regard, the user can handle a user interface control, such as a cursor, using touchless finger movements. As illustrated, the sensing unit 110 can be positioned atop, integrated within, or part of a keyboard 160. The sensing unit 110 is not restricted to being placed on, or within, the keyboard. The sensing unit 110 can also be attached to the display 121 (not shown).

In one embodiment, the sensing unit 110 can be an ultrasonic sensor system that estimates a finger location to move a cursor. The sensing unit 110 can provide absolute coordinate information to the computer 125 for positioning a cursor on the display 122. The sensing unit can include processing logic to determine a location of a finger positioned above the keyboard. The sensing unit 110 can be a wired or wireless connection to the computer 125. For example, the sensing unit 110 can be connected to an input device port of the computer 125 through a USB, PS/2, a serial port, software interface, device driver, or the like. The sensing unit 110 can also be connected to the computer 125 through a wireless connection such as an infrared port, an RF connection, a wi-fi connection, an Ethernet connection, or the like. The sensing unit 110 can also be directly coupled to the display 122, or monitor, for controlling a cursor or object on the display.

FIG. 4

Figure 4:
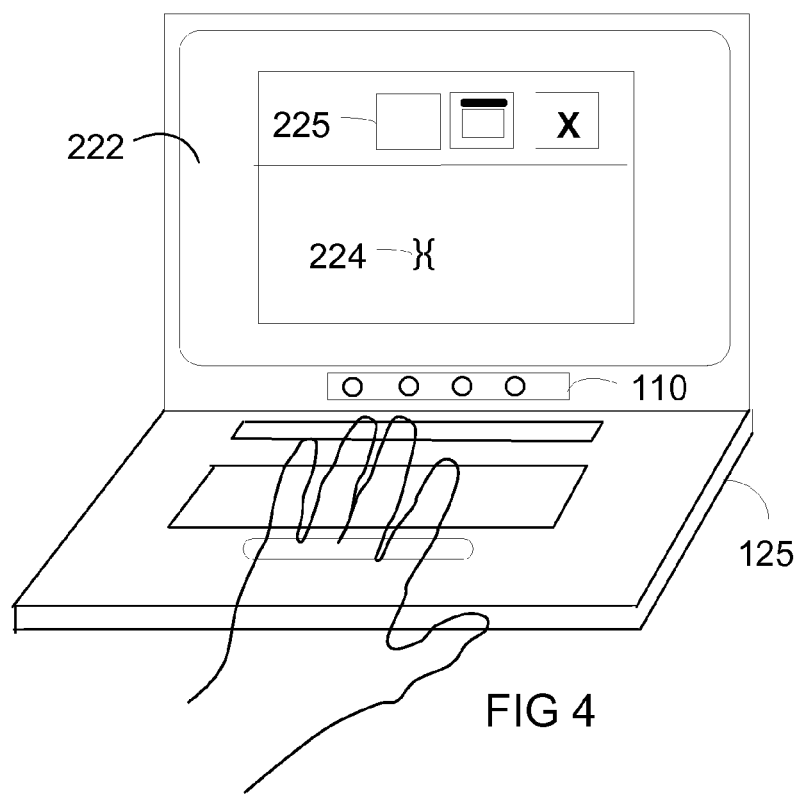
FIG. 4 is an exemplary configuration of the touchless sensing unit in a laptop for providing touchless user interface control in accordance with an embodiment of the inventive arrangements.

In another arrangement, the sensing unit 110 can be included within or integrated with a laptop computer 230 as shown in FIG. 4. A user can move a finger in the touchless sensing space created by the sensing unit 110 to acquire control of an object, such as a cursor 124, or menu item 225, in a computer application.

FIG. 5

Figure 5:
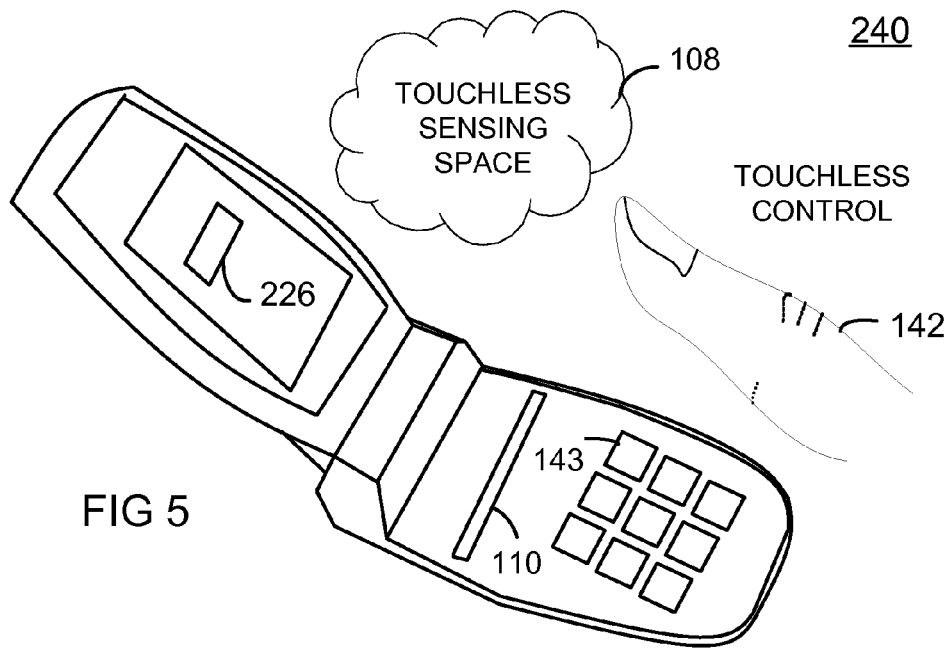
FIG. 5 is an exemplary configuration of the touchless sensing unit in a mobile device for providing touchless user interface control in accordance with an embodiment of the inventive arrangements.

Referring to FIG. 5, another exemplary application for the sensing unit 110 and method 200 is shown. The sensing device 110 can be integrated with a mobile device 240. In one arrangement, the sensing unit 110 can be placed above a keypad 143 of the mobile device 240. The sensing unit 110 can create the touchless sensing space over the keypad 143 and in front of a display. The touchless sensing space is not limited to the arrangement shown. For example, the touchless sensing space 108 can be above the keypad, above the display, or above another portion of the mobile device 240. The touchless sensing space 108 provides a virtual interface to the mobile device. A user can position a finger 142 or a thumb within the touchless sensing space 108 to handle one of more controls of the mobile device, such as a menu item 226.

FIG. 6

Figure 6:
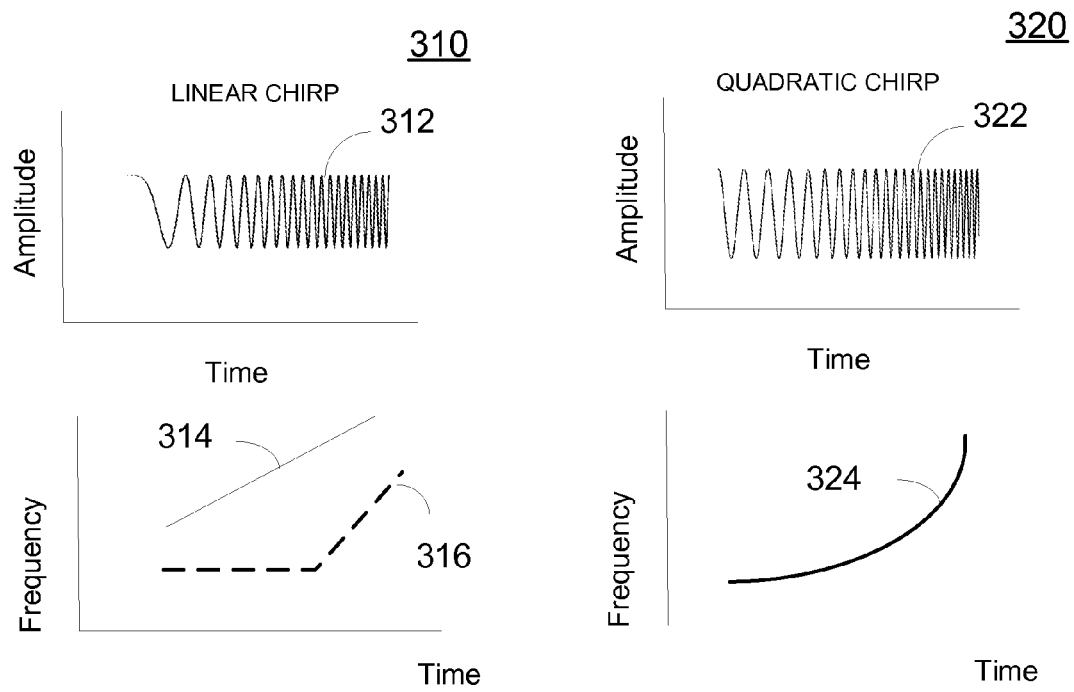
FIG. 6 is an illustration of chirp signals used for range detection in accordance with an embodiment of the inventive arrangements.

Referring to FIG. 6, a pair of chirp signals 310 and 320 are shown. Briefly, the chirp signals are sent from the sensing unit 110 in a direction of an object, such as a finger (See FIG. 5). The chirp signals are reflected off the object and captured at the sensing unit 110. The chirp signals are condition pulse signals that improve a detectability of the pulse. The pulse shaper 101 in FIG. 1 can produce a linear chirp 310 or a quadratic chirp 320. The pulse shaper 101 can produce numerous types of chirp signals, of which 312 and 322 are provided for illustration. In one arrangement, the pulse shaper 101 can convert a square wave pulse to a chirp signal. Embodiments of the invention are not limited to these pulse shapes and other pulse shapes are contemplated. It should be noted that the form of the chirp signals presented can be formed by means other than pulse compression. Analog and digital electronic circuits, op-amps, software programs, and digital logic can produce chirp signals similarly to those shown in FIG. 6, and the embodiments of the invention are not restricted to only employing a pulse shaper for producing the chirp.

In one example, the linear chirp 312 can be represented as a frequency modulated sine wave with linearly increasing frequency 314. As another example, the linear chirp 312 can also be represented as a piece-wise linear function shown in 316. For instance, the first portion of the chirp signal 316 can contain constant frequency modulation followed by a second portion which can be a linearly increasing frequency modulation. The chirp signal is not limited to being linearly modulated. For example, the pulse shaper 101 can produce a quadratic chirp signal 320. The quadratic chirp signal 320 can be characterized by a non-linearly varying frequency modulation with a quadratic phase. The chirp signal 322 can be represented by the frequency and time characteristics of plot 324. As can be seen, the frequency increases in an exponential fashion with time. The exponential frequency increase can be seen in the increased periodicity of the time signal 322.

FIG. 7

Figure 7:
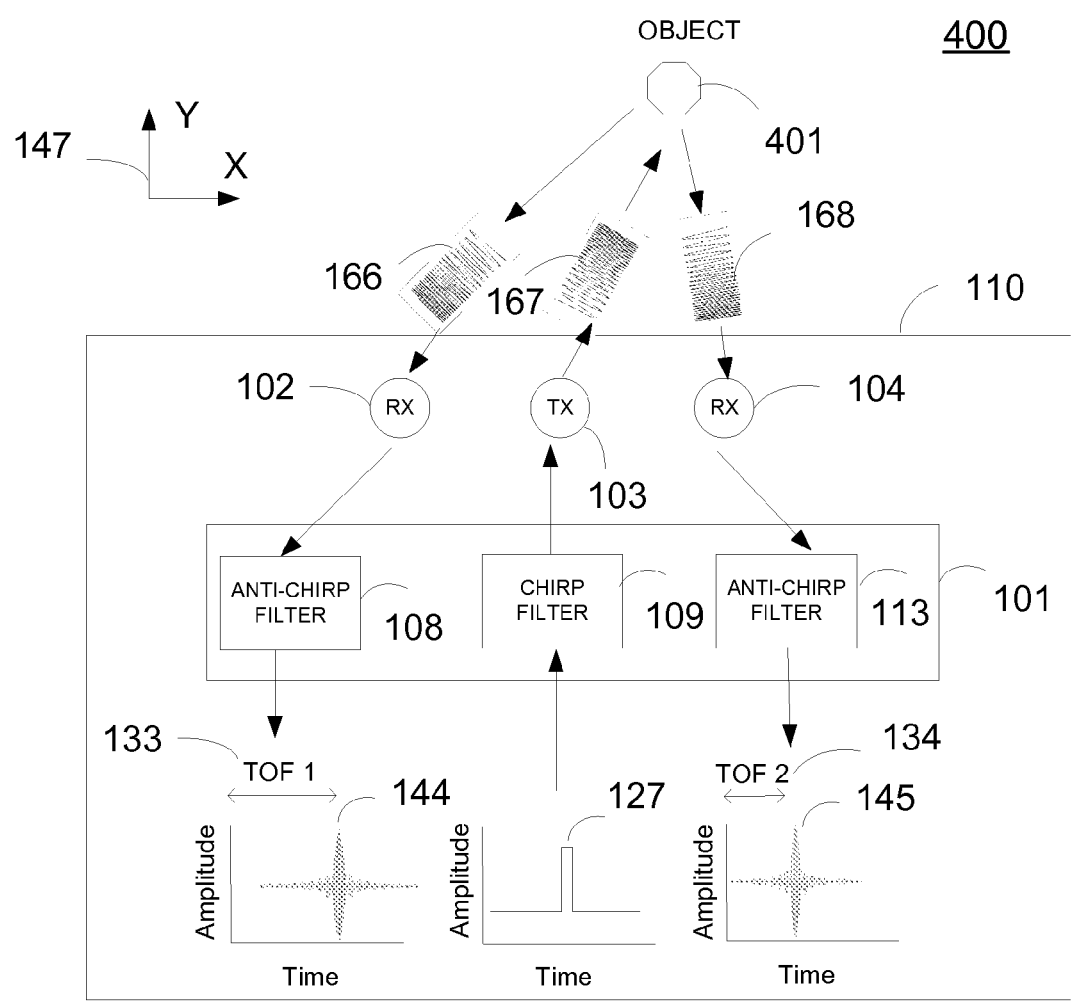
FIG. 7 is an illustration of pulse shaping for use in range detection in accordance with an embodiment of the inventive arrangements.

Referring to FIG. 7, an illustration of pulse shaping in the context of a range detection application in accordance with the embodiments of the invention is shown. In particular, the sensing unit 110 can identify a location and movement of an object 401. The sensing unit 110 can include the pulse shaper 101 which can transmit and receive pulse shaped signals, such as chirp signals 310 and 320 (See FIG. 6). Briefly, the pulse shaper 101 uses chirp signals for increasing the timing resolution of a reflected signal, determining an accurate arrival time, and resolving the location and movement of the object 401 from the arrival time. As noted in FIG. 7, the chirp signals can improve a detection accuracy.

The sensing unit 110 can contain sensing elements 102, 103, and 104. In the shown arrangement, sensing units 102 and 104 serve as receivers, and the sensing element 104 serves as a transmitter. Multiple receivers, camera elements, and sensing instruments such as microphone arrays are contemplated within the scope of the invention. The operations among the sensing elements can be interchangeable and are shown only for illustration. The sensing unit 110 can emit and receive digital communication signals such as a binary signal or physical signals such as light, ultrasound, radio frequency, and acoustic waves.

As one example, the sensing unit 110 can rest atop a keyboard for detecting finger movement or within a keyboard 220 as previously shown in FIGS. 3 and 4. In such regard, the sensing unit 110 can be used to track a finger and control a user interface object in accordance with the finger movement. The sensing unit 110 can process multiple finger movements as well as hand movements, and is not restricted to tracking only solitary finger movements. The sensing unit 110 can acquire signal reflections off the finger for estimating a position of the finger or any other object.

The pulse shaper 101 can include at least one chirp filter 109 and at least one anti-chirp filter 108 as shown in FIG. 7. In one arrangement, the chirp filter 109 can process a square pulse 127, generated by the sensing unit 110, for producing a chirp signal 167 transmitted by the transmitting element 103. The anti-chirp filter 108 can receive a reflected chirp signal 166 from the receive element 102 and convert the reflected chirp signal to a sinc (cardinal sine) modulated waveform 144, or any other suitable signal with strong coherence, or correlation, properties. The anti-chirp filter 113 can also receive a reflected chirp signal 168 from the receive element 104 and convert it to a sinc (cardinal sine) modulated waveform 145. The invention is not limited to converting the signal to a sinc functional as there are other signal formats suitable for increasing detectability. The pulse shaper 101 provides pulse compression to increase the resolution accuracy for tracking an object movement 401, such as a finger.

In one arrangement, the sensing unit 110 can directly transmit the square wave pulse 127 from the transmitter element 103 without using the pulse shaper 101. In another arrangement, the pulse shaper 101 is employed to shape the square wave pulse 127 into a more robust signal for detection purposes. In general, the sensing unit 110 without the pulse shaper 101 can transmit and receive square wave pulses for detecting a location of an object, such as a finger. For example, the TX element 103 can transmit a square pulse to a finger above a keyboard or a mobile device, and the signal can reflect off the finger producing a reflected signal which is captured by RX 102 and RX 104. A time of flight (TOF) can be measured, and a position of the finger 401 can be determined using geometric positioning. The sensing unit employs geometric positioning which specifies one unique point for two TOF measurements. The principle can be extended to three dimensions similarly. The sensing device 110 can also identify a location and movement of an object in three dimensions with multiple sensors. For example, the flight path 103 to 401 to 104 specifies the TOF for the rightmost RX sensor, and the flight path 103 to 401 to 102 specifics the TOF for the leftmost RX sensor. The sensing unit 110 uses the two TOF measurements to determine a unique location of the finger in a two dimensional space 147. In the illustration, the sensing unit 110 estimates a finger location that corresponds to the point 401. With three receivers, the sensing unit 110 can identify a location and movement in three dimensions.

FIG. 8

In order to make a TOF measurement, the sensing unit 110 estimates the time difference occurring between when a square wave pulse was transmitted and when it was received. The same is true of a pulse shaped signal. Briefly, referring to FIG. 8, a pictorial for the detection of a square wave pulse is shown. Under ideal circumstances, the leading edge 716 of the TX pulse is used as the trigger to set the start period of the TOF, and the leading edge 717 of the RX signal is used as the trigger to set the end period of the TOF. The processor 107 sets a threshold to detect a leading edge of the pulse upon transmission and reception. For example, the processor 107 determines the leading edge 716 of the ideal square wave pulse transmitted by the sensing unit element 103 for setting a start time. The processor 107 then determines the leading edge 717 of the signal return that was reflected off the object 401 for determining an end time. The difference between the start time and the end time is the TOF. A TOF is generated for the each TX and RX pair. In other embodiments, with multiple sensors, the TOF can also be measured for each TX and RX pair for providing touchless sensing in three dimensions. The embodiments are not limited to the sensor arrangements shown and more sensors can be added in more that one dimension for providing TOF measurements.

Leading edge detection of a square wave generally requires ideal conditions which are difficult to achieve. In practice, a square wave pulse is generally smeared into an exponentially increasing and decreasing pulse 714 due to the limitations of the transducer elements. For example, the TX 103 can exhibit mechanical limitations during the production of the square wave pulse. Consequently, the transmitted pulse 714 is smeared as seen by the amplitude ramping and amplitude decaying. The transducers vibrate at a fundamental frequency considered the fundamental frequency of the device element. Accordingly, detection of the leading edge of a smeared pulse 714 by threshold detection becomes more elusive since the amplitude of the pulse 714 has been smeared.

FIG. 9

Errors in the TOF can lead to positional errors in determining the object (e.g. finger) location in a two dimensional space. For example, an error in the TOF for a single range measurement can lead to inaccuracies along a line, such as a range. An error in two TOF measurements, using geometric positioning, leads to inaccuracies within a plane. For example, referring to FIG. 9, a TOF over error for the rightmost TX-RX pair 103/104 (see FIG. 8) can expand the ellipse 822, whereas a TOF under error for the rightmost TX-RX pair 103/104 (see FIG. 8) can compress the ellipse 822. Accordingly, a TOF over error for the leftmost TX-RX pair 103/102 can expand the ellipse 821, whereas a TOF under error for the leftmost TX-RX pair 103/102 can compress the ellipse 821. Notably, this can result in a two-dimensional error as shown by the ellipse 840. Due to the coupling of the two TOF measurements within the geometric positioning arrangement, the detected location of the object can be anywhere within the projection error region 840. Notably, the errors can be extended to multi-dimensional spaces as the number of sensor elements (e.g. TX-RX pairs) increases.

Figure 8:
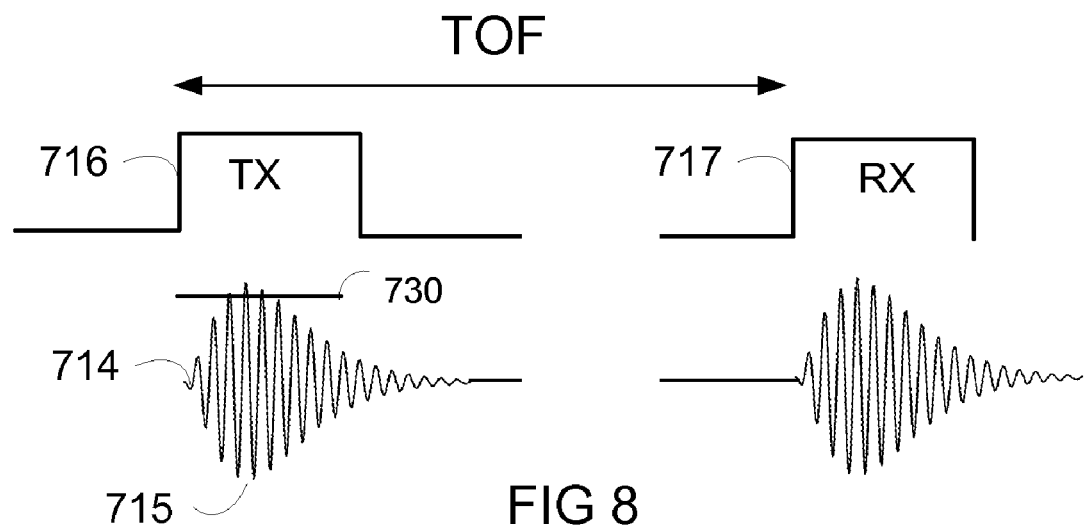
FIG. 8 is an illustration for a square pulse and a smeared pulse in accordance with an embodiment of the inventive arrangements.
Figure 9:
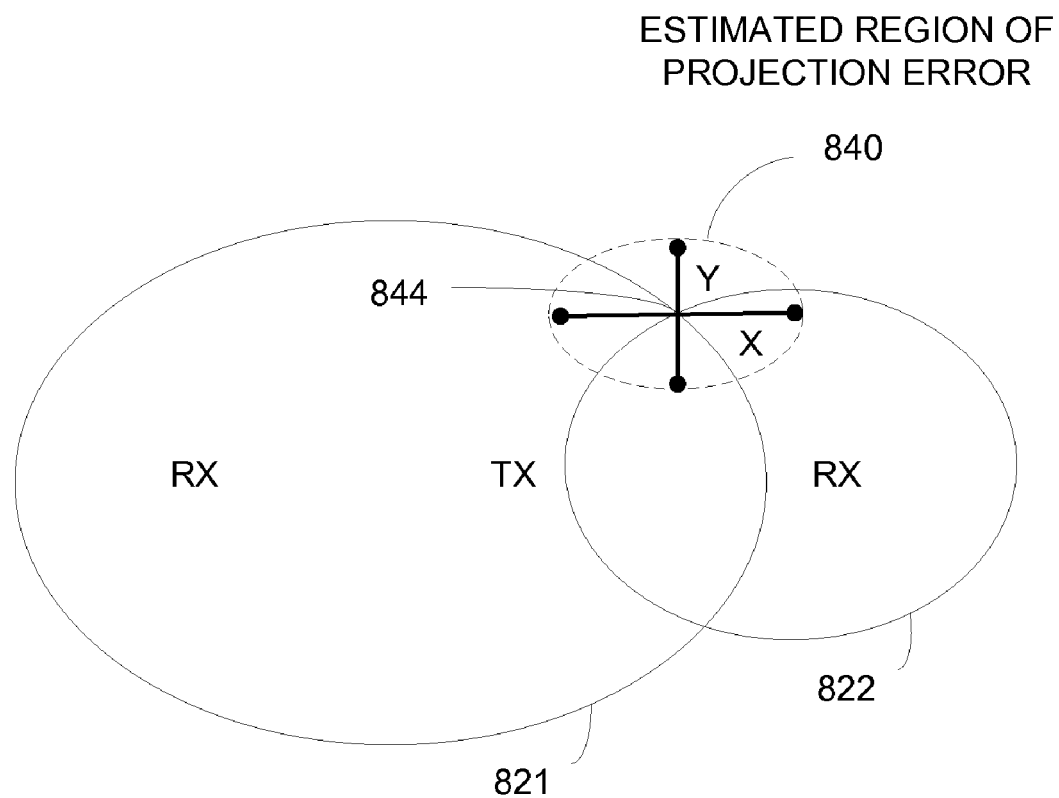
FIG. 9 is a plot of relative displacement error in range measurements in accordance with an embodiment of the inventive arrangements.

Referring to FIGS. 7 and 8 for describing detection inaccuracies, the TX element 103 (FIG. 7) can produce a modulated signal which has a high frequency periodic component 715 (FIG. 8). The transmitted pulse 714 resembles a smeared and modulated waveform. Each of the carrier components (periodicities) can also lead to false triggering due to amplitude variations among the carrier components. For example, a feature such as a peak amplitude or zero crossing can lead to whole cycle errors when an incorrect maximum peak is selected as the reference. For example, an amplitude threshold 730 can be generally set, and the point at which the wave form exceeds the threshold, can be considered the leading edge for arrival time estimation. If the lead peak of the waveform varies inconsistently due to environmental effects or mechanical limitations, the threshold crossing can vary over time, leading to deviations in the arrival time estimate. The processor 107 may falsely determine the TOF in view of the smeared and modulated leading edges of the transmitted pulse. In contrast, a pulse shaped signal preserves certain signal properties which make it more robust to smearing of the leading edge pulse. Conceptually, pulse shaping spreads out the signal energy in a well determined manner. This concentrate the energy at in a narrow time bandand spreads the frequencies over a wide frequency band. The energy is concentrated at a particular point in time. The processor 107 can more easily detect the narrow high energy signal more readily than a smeared leading edge.

The embodiments of the invention serve to overcome the difficulty of determining the leading edge of the smeared square wave pulse through pulse compression. Pulse compression produces a transmitted signal that is more robust to amplitude and phase variations produced by the environment or transducer elements within the sensing unit. Pulse compression is applied to decrease the estimated projection error space 844 within the vicinity of the object for which a location is desired. Further, pulse compression is applied within a multi-dimensional processing space for identifying absolute positions as well as relative displacements. For example, referring to FIGS. 3 and 4, the sensing device 110 can be used for sensing finger movement for controlling the cursor on the display. The cursor can be moved in accordance with the determined absolute position and relative displacement of the finger. Pulse shaping increases the resolution accuracy for TOF measurements, and accordingly, the accuracy in moving the cursor.

FIG. 10

Figure 10:
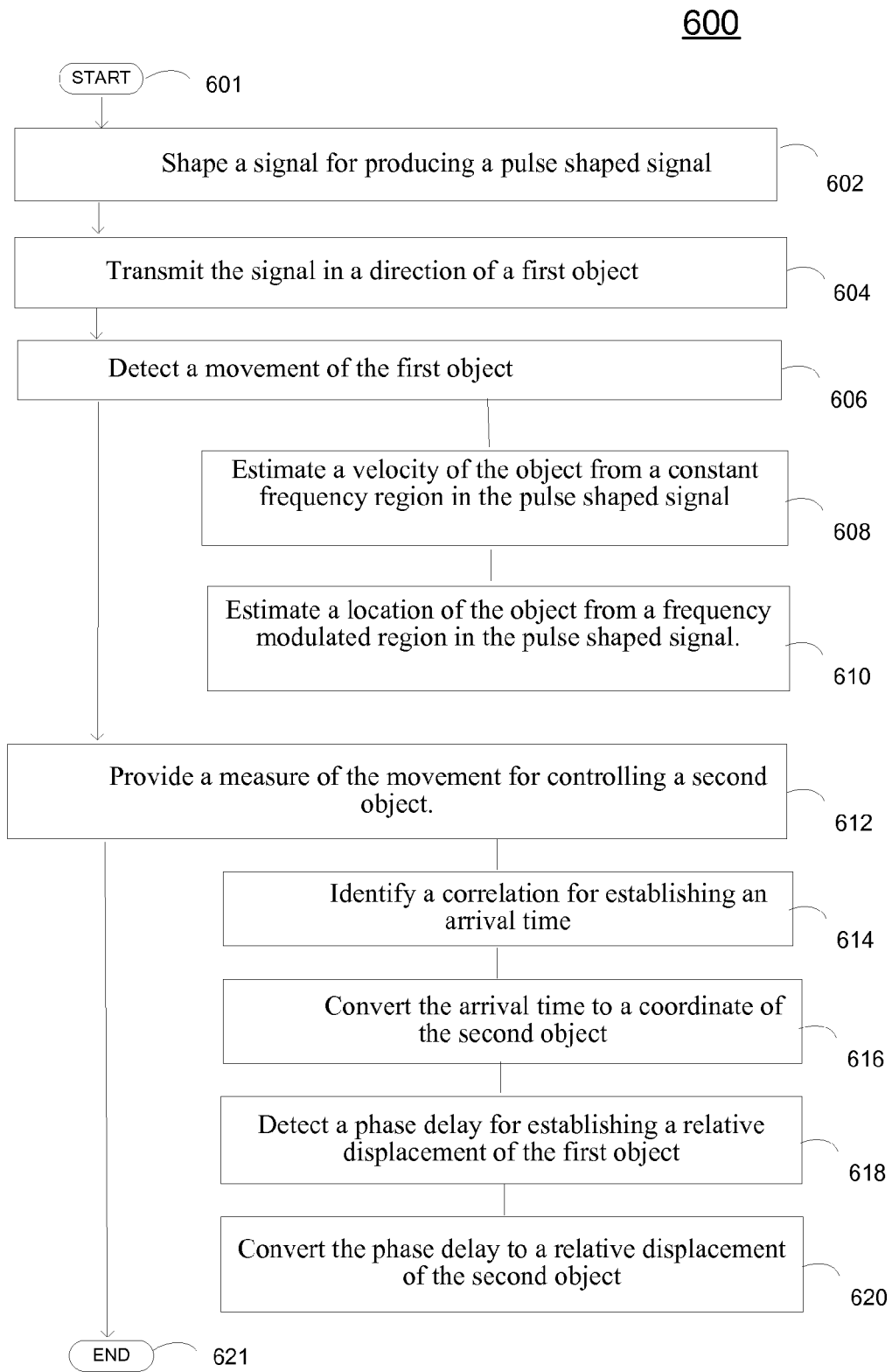
FIG. 10 is a method range detection using pulse shaping in accordance with an embodiment of the inventive arrangements.

Referring to FIG. 10, a method 600 for range measurement is shown. When describing the method 600, reference will be made to FIG. 1 through 5, although it must be noted that the method 600 can be practiced in any other suitable system or device. Moreover, the steps of the method 600 are not limited to the particular order in which they are presented in FIG. 10. The method 600 can also have a greater number of steps or a fewer number of steps than those shown in FIG. 10.

At step 601, the method 600 can start. At step 602, a signal can be shaped for producing a pulse shaped signal. For example, referring to FIG. 7, the sensing unit 110 generates a square wave pulse 127 which can be processed by the chirp filter 109 before being transmitted by the transmitter element 103. The pulse shaper 101 includes at least one chirp filter 109 and one-anti chirp 113 filter for processing signals. Referring ahead to FIG. 11, the chirp filter 109 can include the all-pass element 515 for introducing time dispersion into the square wave pulse 127. The pulse shaper 101 passes the square wave pulse 127 to the input of the all-pass element (e.g. filter cascade) to modify the phase structure of the signal. The all-pass element 515 alters the time structure of the waveform by introducing time delay elements in the feed forward and feedback path of an all-pass filter 515. Phase and time are interrelated and linear or non-linear alterations to the time structure produce linear or non-linear frequency modulation, respectively. Referring back to FIG. 7, the chirp filter 109 excites the square wave pulse and converts it to a frequency modulated waveform based on one of the warping curves 530

(See FIG. 11) set by the phase warping parameter, $\alpha$. Additionally, the phase warping parameter can be tuned to compensate for mechanical non-linearity's in the transducer elements of the sensing unit 110. The pulse shaper 101 converts the square wave pulse 127 to a transmitted chirp signal 167

At step 604, the signal can be transmitted in a direction of a first object. For example, referring to FIG. 7, the TX element 103 can transmit the chirp signal 167 towards a finger, as the object 401. In general, the transducers have broad illumination which can capture signal reflections within a general plane, or three dimensional space. Notably, referring to FIG. 6, the transmitted chirp signal 167 can be represented by the linear chirp 310, the quadratic chirp 320, or any other frequency modulated, amplitude modulated, or phase modulated signal. In one arrangement, the transmitted chirp signal 167 has a constant frequency component followed by a frequency modulated component.

At step 606, a movement of the first object can be detected. For example, referring to FIG. 7, the receive elements RX 102 and 104 receive a chirp signal 166 and 168 reflected off a finger 401, respectively. The pulse shaper 101 processes the reflected chirp signals 166 and 167 with anti-chirp filters 108 and 113. The same anti-chirp filter can be used to de-chirp the reflected chirp signal. Separate anti-chirp filters are shown to illustrate where the filtering occurs within the context of the motion sensing system. The pulse shaper 101 applies an anti-chirp filter to a chirped signal for converting the signal to a modulated sinc (cardinal sine) signal. The modulated sinc function can have a high frequency modulation component corresponding to the fundamental frequency of the transmitter element and an envelope corresponding to a sinc function. Notably, variations in the de-chirped signal exist and the sinc function was selected for the inherent symmetric and concentrated energy properties. Consequently, the signal energy has been concentrated at a particular point along the envelope that corresponds to the center of the sinc function, which is symmetric.

The processor 107 can detect the high concentrated energy sinc signal more readily than a leading edge or a smeared pulse. The modulated sinc pulse concentrates the energy at a particular point. The processor can detect the signal when the high concentrated energy exceeds the threshold detection. In practice, the processor 107 declares a detection when the concentrated high energy sinc signal pulse exceeds the threshold mark. Referring to FIG. 7, the processor 107 detects the peak 144 of the leftmost sinc function and identifies an arrival time for establishing a TOF 133 based on the receive time of the peak 144. Accordingly, the processor 107 detects the peak 145 of the rightmost sinc function and identifies an arrival time for establishing a TOF 134 based on the receive time of the peak 145. The processor 107 determines a TOF for both TX-RX pairs. The processor can then determine a location or a change in the location. For example, the processor 107 can determine a differential TOF to identify a change in location of the object. The processor 107 can use TOF measurements and dTOF measurements for determining a position and change in position of the object in a two or three-dimensional space.

Steps 608 and 610 are optional steps for identifying object location and movement from a chirp signal. At step 608, a velocity of the object can be estimated from a constant frequency region in the pulse shaped signal. For example, referring to FIG. 4, the object is a finger which a user moves in touchless sensing field. The sensing unit 110 saves a copy of the transmitted pulse shaped signal 167 and compares it to the reflected pulse shaped signal 166 received at a transmitter. A comparison is generated for each TX-RX pair. The comparison can be based on differential time of flight. As previously mentioned, the pulse shaped signal can have a constant frequency region and a frequency modulated region. For example, referring to FIG. 6, a piecewise linear chirp 316 has a first portion of constant frequency followed by a second portion of linearly increasing frequency. Upon detection of the reflected pulse shaped signal, a TOF is recorded, and the sensing unit 110 performs an alignment of the received pulse shaped signal and the saved copy of the transmitted signal. A dTOF can be measured between the two received signals.

Pulse shaping imparts a characteristic time stamp on a pulse signal. For example, the constant frequency region is distinct from the frequency modulated region such that a coherent alignment of the signals are possible. For example, the processor 107, can track specific carrier components within the constant frequency region because it can set a reference to the frequency modulated (FM) region. The processor 107 identifies the FM region and then determines an offset correction for alignment of the two signals (the saved copy and the reflected signal). For example, the sensing unit 110 can determine the locations of zero crossings and determine how the crossing points change over time. The processor 107 determines a difference between the two signals within the constant frequency region for determining a relative displacement. Comparatively, a smeared square wave pulse, such as 415 in FIG. 7B, may not directly align with a second smeared square wave pulse. The fundamental frequencies are the same due to the constant frequency, which can lead to whole cycle timing errors. For example, a correlation between 416 and 418 reveals likelihood maxima at points corresponding to the carrier components. If a leading edge is overly smeared, the correlation may return a false local maxima corresponding to a carrier component thereby leading to inaccurate TOF measurements.

Notably, movement of an object, such as a finger, changes the TOF for any TX-RX pair. As the finger 401 moves farther away from the sensing unit 110, the TOF increases. As the finger 401 approaches the sensing unit 110, the TOF decreases. The sensing unit 110 estimates a location based on the TOF measurements. It also captures traces of the signal and monitors a delta between the traces. The delta is the difference in sample shift between a transmitted signal and its reflection. Notably, the delta describes the incremental change in samples associated with the finger movement. That is, the processor 107 performs differential time, or phase, analysis. Samples are specified by a sampling period thereby describing a measure of time. Accordingly, determining at least two positions of the finger using TOF measurements and determining a delta provides sufficient information for determining a velocity of the object (e.g. finger). The sensing unit 110 determines the velocity of the object by measuring a difference in position over a difference in time. The difference in position is determined by estimating a relative sample displacement (delta) between timestamp locations within the constant frequency region of the pulse shaped signal reflections.

At step 610, a location of the object can be estimated from a frequency modulated region in the pulse shaped signal. For example, referring to FIG. 6, a FM region is characteristic to each chirp signal and provides improved correlation properties. For example, a first and second chirp signal with a continuous frequency (CF) region and a frequency modulated (FM) region, correlate well when the chirp signals directly overlay, i.e. the CM regions overlay together and the FM regions overlay together. The FM region imparts a unique time stamp that differentiates the FM region from the CF region.

Referring to FIG. 7, the sensing unit 110 for RX 102 saves a copy of the transmitted pulse signal 167 and compares it to a received reflected pulse signal 166. In a first approach to estimating the TOF, the processor 107 processes the reflected pulse signal 166 prior to being processed by the anti-chirp filter 108. In this arrangement, the processor 107 operates directly on the received reflected pulse signal for estimating a TOF. The processor also uses the de-chirped signal (sinc function) to determine a more precise TOF through phase dispersion. Consequently, the processor 107, produces an estimate of the TOF by examining the FM region, and it also produces a refinement to the TOF using the de-chirped signal (i.e. sinc function) for identifying the time of threshold crossing. The FM component provides a unique timestamp since the periodicities correlate over a specific region. A square wave pulse with constant frequency correlates at multiple points when the pulse is smeared. The FM component in the chirp signal can be associated with the leading edge of the square wave pulse.

At step 612, a measure of the movement is provided for controlling a second object. For example, referring to FIG. 3, the motion sensing unit 110 is used to track finger movement above a keyboard 220 for moving a cursor 124 on a display 122. Consequently, the cursor 124 moves in accordance with the finger movement. Referring to FIG. 7, the sensing unit 110 can determine two TOFs for estimating a precise location of the finger using pulse compression. As the finger moves above the keyboard, the sensing unit 110 determines an absolute location of the finger based on geometric positioning, and it also determines relative displacement, for estimating a finger velocity and acceleration component.

Steps 614 to 620 are optional methods for converting motion of one object (e.g. finger) to motion of a second object (e.g. cursor). For example, at step 614, a correlation for establishing an arrival time is identified. Referring to FIG. 7, the sensing unit 110 processes the received reflected chirp signal 166 for identifying characteristic regions of the chirp signal; namely, the constant frequency region and the frequency modulated region. The sensing unit 110 applies a correlation on the reflected signal received 166 with at least one of the previous reflected signals stored in memory. The step of correlating the signal distinguishes the two aforementioned regions sufficiently necessary for determining an absolute location and a velocity (relative displacement). At step 616, the arrival time can be converted to a coordinate of the second object. For example, the sensing unit converts the two TOF measurements into a cursor coordinate using geometric positioning. For example, referring to FIG. 9, the sensing unit produces a loci of points in the form of an ellipse 821 or a circle based on the sensor arrangement for each TOF. The sensing unit 110 identifies the intersection of the ellipses 821 and 822 for determining a location of the finger. The location is then used to update the cursor coordinate.

At step 618, a phase delay can be detected for establishing a relative displacement of the first object. For example, referring to FIG. 7, the sensing unit 110 determines a phase delay by measuring a sample distance between zero crossings between a currently received reflection signal and a previously stored reflection signal. At step 620, the phase delay can be converted to a relative displacement of the second object. For example, referring to FIG. 7, the sensing unit 110 determines a relative displacement in the X and Y direction 147 from geometric positioning of the TOF measurements. The sensing unit 110 passes the relative displacement for the finger into differential displacement signals for moving a cursor using standard USB and PS/2 formats. For example, referring to FIG. 3, the computer 125 receives input connections from standard mouse devices in a PS/2 or USB format for controlling a cursor object 124 on a display 122.

FIG. 11

Referring to FIG. 11, the non-linear phase warping element 510 is shown. The phase warping element 510 can include at least one all-pass filter 515 to modify the phase characteristics of a signal. In the preferred embodiment, the warping element 510 can also be an array 516 of all-pass filters. The cascading of all pass filters can produce a frequency modulated chirp signal as a digital solution, similarly to a voltage controlled oscillator such as those found in a phase locked loop system. An all-pass filter 505 can provide phase warping characteristics without changing the magnitude structure of a signal. An all-pass filter 515 can be characterized as a single zero and single pole filter with unity magnitude gain and non-linear phase characteristics. The all-pass filter can provide time dispersion properties by changing the time structure of a signal to consequently alter the signal's phase characteristics.

FIG. 12

Referring to FIG. 12, a phase change plot 520 and a frequency warping plot 530 are shown for the phase warping element 515. The phase change plot 520 reveals the change in the input and output phase characteristics of the all-pass filter. The phase change plot 520 is merely an illustration which can change for different all-pass filters or phase warping elements. The frequency warping plot 530 shows the input and output characteristics of the all-pass filter for different values of the warping parameter $\alpha_i$. Notably, an all-pass filter is one filter configuration that can be used to warp the phase of an input signal to a predetermined phase according to a phase warping curve 530. For example, referring to FIG. 11, a family of curves 530 reveals the phase warping characteristics as a function of the warping parameter, $\alpha_i$ seen in the all-pass element 515. The phase warping characteristics can be specified by the single phase warping term, $\alpha_i$, which is used as the feed-forward and feed-back term in the all-pass filter 515.

The phase warping term $\alpha_i$ uniquely determines a phase warping curve, and every value of $\alpha_i$ has a unique phase warping curve associated with it, 530. For example with $\alpha_i=0.5$ the phase warping curve 533 describes the phase warping relationship between an input signal and output signal to the all-pass element 515. With $\alpha_i=0$, there is no phase warping as seen by the straight line 535, and the all-pass filter 515 reduces to an infinite impulse response (IIR) filter. A signal can be warped in accordance with a curve specified by the warping parameter. The warping element 510 can be used to spread out the energy of a signal over time for the purpose of providing a phase robust representation of the signal. The process of injecting time dispersion can extend the signal in time and accordingly narrow the signal spectrum upon a de-chirping operation. The warping element 510 can spread the energy of a signal over time to concentrate the energy at a particular point in frequency upon a de-chirping operation.

In summary, embodiments of the invention concern a method and system for monitoring motion. The system can include a sensing unit for detecting a movement of a first object, and a processor for providing a measure of the movement. The processor can convert the measure to a coordinate signal for moving a second object in accordance with the movement of the first object. The system can further include a pulse shaper connected to the sensing unit for producing a pulse shaped signal prior to transmission by the sensing unit. In one aspect, a finger is a source of the movement and the processor converts a position of the finger to a cursor coordinate signal for moving a cursor in view of the measure.

In one arrangement, the sensing unit transmits and receives at least one of a discrete-time signal and a continuous-time signal for measuring the movement. The signal can be an ultrasonic signal, an acoustic signal, or an optical signal. The sensing unit can emit a pulse shaped signal and receive a pulse shaped signal reflection to determine a time of flight measure. At least one portion of the pulse shaped signal can be a frequency modulated region, a constant frequency region, a phase modulated region, a pulse compression region, or a chirp region. In one arrangement, the pulse shaper can be at least one all-pass filter, such as an all-pass filter cascade, for providing the phase dispersion properties of the pulse shaped signal.

The pulse shaper can convert a pulse shaped signal reflection to a sinc function signal, and the processor can determine an arrival time by identifying a maximum point of the sinc function signal. In one arrangement, the processor estimates a location of the finger using a frequency modulated region of the pulse shaped signal reflection, and a velocity of the object using a continuous frequency region of the pulse shaped signal reflection.

In another aspect of the embodiments of the invention, a system for monitoring motion for controlling a movement of an object is provided. The system can include a sensing unit for tracking a movement, a pulse shaper for producing a pulse shaped signal prior to transmission by the sensing unit, and a processor coupled to the sensing unit for receiving a pulse shaped signal reflection and determining a measure of the finger movement in view of an arrival time of the reflected signal. The pulse shaper can impart one of a frequency modulated effect, a phase modulated effect, or a chirp effect onto a portion of the signal for generating a unique time stamp on the signal for controlling movement of the object in accordance with the measure.

In another aspect of the embodiments of the invention a method for monitoring a movement is provided. The method can include shaping a signal by one of a frequency modulated technique, a phase modulated technique, or a pulse compression technique for producing a pulse shaped signal, and transmitting the signal in a direction of a first object. The shaping can impart a unique time stamp onto a portion of the signal for tracking the movement.

The method can further include detecting the movement of the first object, and providing a measure of the movement for controlling a second object. The signal can be a continuous transmission in a direction of the first object including one of a frequency modulated signal, a phase modulated signal, or an amplitude modulated signal.

The shaping comprises pulse shaping for estimating a velocity of the object from a constant frequency region, and a location of the object from a frequency modulated region in the pulse shaped signal. In one aspect, at least one all-pass filter can provide phase dispersion for shaping the signal. The step of shaping can concentrates an energy of the signal within a narrow region of the signal for providing a symmetric peak enhanced reflection signal.

The step of detecting the movement of the first object can further include identifying a correlation for establishing an arrival time and converting the arrival time to a coordinate of the second object, identifying a phase delay for establishing a relative displacement of the first object and converting the phase delay to a relative displacement of the second object. The second object can be controlled in accordance with a measure of the arrival time and the phase delay. In one aspect, the pulse shaping can convert the signal reflection to a sinc function signal, and the detecting can determine an arrival time by identifying a maximum point within the sinc function signal. In one mode, the first object can be at least one finger and the second object can be a cursor.

In another aspect of the invention, an ultrasonic system for monitoring movement is provided. The system can include a sensing unit for tracking a finger movement, a pulse shaper using a phase warping element for producing a pulse shaped signal prior to transmission by the sensing unit, and a processor coupled to the sensing unit for receiving at least one pulse shaped signal reflection off the finger. The pulse shaper can impart one of a constant frequency region, a frequency modulated region, a phase modulated region, or a chirp region onto a portion of the signal. The processor can estimate a location of the finger using a frequency modulated region of the pulse shaped signal reflection, and a velocity of the finger using a continuous frequency region of the pulse shaped signal reflection.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A sensing device for providing touchless control comprising:
   a pulse shaper for producing a pulse shaped signal, the pulse shaped signal intended for reflecting off a first object to produce a reflected signal, wherein at least one portion of the pulse shaped signal is at least one among a frequency modulated region, constant frequency region, phase modulated region, and a chirp region;
   a phase detector for receiving and identifying a relative phase of the reflected signal with respect to a previously received reflected signal, and
   a processor operatively coupled to the pulse shaper for receiving the reflected signal, tracking a location and a movement of the first object from an estimated arrival time of the reflected signal and the relative phase, and providing control to a second object that is a user interface control in accordance with the location and the movement of the first object,
   wherein the processor estimates the location of the first object from a frequency modulated region of the reflected signal, and a velocity of the first object from the relative phase from the constant frequency region of the reflected signal.

2. The sensing device of claim 1, wherein the pulse shaper is a physical transducer element that emits the pulse shaped signal with a frequency modulation portion and an amplitude modulation portion.

3. The sensing device for claim 1, wherein the pulse shaper includes at least one all-pass filter as a phase warping element for providing phase dispersion in the pulse shaped signal.

4. The method for claim 1, wherein the pulse shaper concentrates an energy of the pulse signal within a narrow region of the pulsed shaped signal to produce a symmetric peak in the pulse shaped signal.

5. The method for claim 1, wherein the pulse shaper transmits the pulsed shaped signal as a continuous transmission of a frequency modulated signal, a phase modulated signal, or an amplitude modulated signal.

6. An ultrasonic sensor device for short-range detection, comprising:
   a pulse shaper for producing an ultrasonic chirp signal with an amplitude modulated region and a frequency modulated region;
   at least one transmit sensor operatively coupled to the pulse shaper for transmitting the ultrasonic chirp signal, the ultrasonic chirp signal intended for reflecting off a finger to produce a reflected chirp signal;
   at least one receive sensor for receiving the reflected chirp signal;
   a phase detector for identifying a relative phase of the reflected chirp signal from the frequency modulated region with respect to a frequency modulated region of a previously received reflected signal, and
   a processor coupled to the phase detector and the receive sensor for identifying a location of the finger from an arrival time of the amplitude modulated region of the reflected chirp signal and a movement of the finger from the relative phase of the frequency modulated region, and providing control to a user interface control in accordance with the location and the movement of the finger.

7. A method for touchless control, the method comprising the steps of:
   shaping a pulse signal to produce a pulse shaped signal;
   transmitting the pulse shaped signal, the pulse shaped signal reflecting off a first object to produce a reflected signal;
   receiving the reflected signal;
   identifying a relative phase of the reflected signal with respect to a previously received reflected signal;
   estimating a location of the first object from a frequency modulated region of the reflected signal,
   estimating a velocity of the first object from the relative phase from the constant frequency region of the reflected signal; and
   providing control to a second object that is a user interface control in accordance with the location and the movement of the first object,
   wherein the shaping uses a combination of amplitude modulation, frequency modulation, and phase modulation.

* * * * *